(12) United States Patent
Kubota

(10) Patent No.: US 8,159,760 B2
(45) Date of Patent: Apr. 17, 2012

(54) PROJECTOR AND CONTROL METHOD OF PROJECTOR

(75) Inventor: Shinji Kubota, Ina (JP)

(73) Assignee: Seiko Epson Corporation, Tokyo (JP)

( * ) Notice: Subject to any disclaimer, the term of this patent is extended or adjusted under 35 U.S.C. 154(b) by 256 days.

(21) Appl. No.: 12/539,307

(22) Filed: Aug. 11, 2009

(65) Prior Publication Data

US 2010/0046088 A1 Feb. 25, 2010

(30) Foreign Application Priority Data

Aug. 19, 2008 (JP) ................................ 2008-210357
May 29, 2009 (JP) ................................ 2009-130086

(51) Int. Cl.
*G02B 15/14* (2006.01)

(52) U.S. Cl. ........ 359/697; 359/696; 348/744; 348/745; 348/222.1; 348/333.1; 353/70

(58) Field of Classification Search .................. 359/686, 359/694–698; 348/222.1, 231.7, 744, 745, 348/E3.048, E5.031, E5.137, E9.025, E9.027; 353/69, 101; 250/205

See application file for complete search history.

(56) References Cited

U.S. PATENT DOCUMENTS

| 6,592,228 B1 * | 7/2003 | Kawashima et al. | ......... 353/101 |
| 7,108,375 B2 | 9/2006 | Eguchi | |
| 7,401,929 B2 | 7/2008 | Matsumoto et al. | |
| 7,484,854 B2 * | 2/2009 | Miyasaka | ...................... 353/101 |
| 2010/0302466 A1 * | 12/2010 | Kubota | ........................... 348/745 |
| 2011/0019109 A1 * | 1/2011 | Maeda et al. | .................. 348/745 |

FOREIGN PATENT DOCUMENTS

| JP | A-9-33880 | 2/1997 |
| JP | A-11-109214 | 4/1999 |
| JP | A-2005-49800 | 2/2005 |
| JP | A-2005-156747 | 6/2005 |
| JP | A-2006-5534 | 1/2006 |

* cited by examiner

*Primary Examiner* — Loha Ben
(74) *Attorney, Agent, or Firm* — Oliff & Berridge, PLC

(57) ABSTRACT

A projector includes: a projection lens which includes a zoom mechanism capable of controlling a projection view angle; a zoom drive unit which drives the zoom mechanism; a zoom amount storing unit which stores a zoom amount provided by the zoom drive unit; an operation signal receiving unit which receives a predetermined operation signal; and a zoom control unit which controls the zoom drive unit in such a manner as to set an initial zoom condition determined based on the zoom amount stored in the zoom amount storing unit when the operation signal receiving unit receives the predetermined operation signal.

6 Claims, 11 Drawing Sheets

TELE-END PROJECTION
VIEW ANGLE

WIDE-END PROJECTION
VIEW ANGLE

CENTER PROJECTION
VIEW ANGLE
$$\theta 3 = \frac{\theta 1 + \theta 2}{2}$$

IMAGE ON SCREEN BEFORE CORRECTION

IMAGE ON SCREEN AFTER CORRECTION

PROJECTOR AND CONTROL METHOD OF PROJECTOR

The entire disclosure of Japanese Patent Application No. 2008-210357 filed Aug. 19, 2008 and No. 2009-130086 filed May 29, 2009 are expressly incorporated by reference herein.

BACKGROUND

1. Technical Field

The present invention relates to a projector and a control method of a projector.

2. Related Art

There is a type of projector which changes zoom condition by varying relative positions of a plurality of lenses constituting a projection lens to change projection view angles of images (screen size). JP-A-11-109214 discloses a projector capable of selecting and setting the initial zoom ratio (initial zoom condition) of the projection lens at the time of power ON at the maximum or minimum zoom ratio (zoom condition) or the zoom ratio at the time of power OFF. According to this projector, a zoom drive mechanism of the projection lens is actuated based on the initial zoom ratio thus selected and set while the power source of the projector is turned off. By this method, the projection lens can be set to the selected initial zoom ratio at the time of next power ON.

According to the projector disclosed in JP-A-11-109214, however, there is a possibility that the time required for reaching a desired zoom ratio is prolonged at the time of zoom control such that the desired zoom ratio can be set (zoom drive mechanism is operated) after the next power ON. For example, when the desired zoom ratio is small under the condition of setting the initial zoom ratio at the maximum, operation volume of the zoom mechanism becomes large. In this case, the time required for reaching the desired zoom ratio is long. On the other hand, when the desired zoom ratio is large under the condition of setting the initial zoom ratio at the minimum, operation volume of the zoom mechanism becomes large. In this case, the time required for reaching the desired zoom ratio is long.

SUMMARY

It is an advantage of some aspects of the invention to provide a projector and a control method of a projector capable of solving at least a part of the problems described above.

A first aspect of the invention is directed to a projector including: a projection lens which includes a zoom mechanism capable of controlling a projection view angle; a zoom drive unit which drives the zoom mechanism; a zoom amount storing unit which stores a zoom amount provided by the zoom drive unit; an operation signal receiving unit which receives a predetermined operation signal; and a zoom control unit which controls the zoom drive unit in such a manner as to set an initial zoom condition determined based on the zoom amount stored in the zoom amount storing unit when the operation signal receiving unit receives the predetermined operation signal.

According to this structure, operation starts from the initial zoom condition based on the previous zoom condition stored in the zoom amount storing unit (based on the previous use condition by the user) when the zoom mechanism is operated next time in such a manner as to set a desired zoom condition. Thus, the zoom shift amount can be reduced. Moreover, the time required for zoom shift can be decreased.

It is preferable that the initial zoom condition is a condition corresponding to the center zoom amount between the minimum zoom amount and the maximum zoom amount stored in the zoom amount storing unit.

According to this structure, operation is started from the center zoom amount between the minimum zoom amount and the maximum zoom amount stored in the zoom amount storing unit when the zoom mechanism is operated next time in such a manner as to set a desired zoom condition. Thus, the time required for operating the zoom mechanism can be reduced.

It is preferable that the initial zoom condition is a condition corresponding to a zoom amount in which a first zoom operation time for operating the zoom drive unit in such a manner as to set the minimum zoom amount stored in the zoom amount storing unit coincides with a second zoom operation time for operating the zoom drive unit in such a manner as to set the maximum zoom amount stored in the zoom amount storing unit.

According to this structure, the operation of zoom mechanism is started from a condition corresponding to a zoom amount in which the first zoom operation time for operating the zoom drive unit to set the minimum zoom amount stored in the zoom amount storing unit coincides with the second zoom operation time for operating the zoom drive unit to set the maximum zoom amount stored in the zoom amount storing unit when the zoom mechanism is operated next time in such a manner as to set a desired zoom condition. Thus, the time required for operating the zoom mechanism can be reduced.

It is preferable that the initial zoom condition is a condition corresponding to the zoom amount stored in the zoom amount storing unit as the zoom amount of the projector used last time.

According to this structure, the initial zoom condition corresponds to the zoom amount adjusted when the projector is used last time. Thus, the zoom condition needs no adjustment at the next startup when the projector is used in a fixed projection environment such as a meeting room, a projection room or the like. Accordingly, immediate projection can be achieved.

It is preferable that the predetermined operation signal received by the operation signal receiving unit is a power ON operation signal or a power OFF operation signal.

According to the structure which drives the zoom mechanism in such a manner as to set the initial zoom condition in response to the power ON operation signal, the zoom condition of the projector becomes the predetermined zoom condition when the user turns ON the power source of the projector. Thus, operation starts from the predetermined zoom condition when the zoom mechanism is operated next time. It is possible to drive the zoom mechanism in such a manner as to set the initial zoom condition by the power OFF operation signal. In this case, the zoom condition of the projector becomes the initial zoom condition when the user turns OFF the power source. Thus, operation starts from the predetermined zoom condition when the zoom mechanism is operated next time after power ON. Accordingly, the necessity for setting the predetermined zoom condition at the time of power ON of the projector is eliminated, and the time required for the initial process at power ON of the projector is reduced.

A second aspect of the invention is directed to a control method of a projector which includes a projection lens which includes a zoom mechanism capable of controlling a projection view angle, a zoom drive unit which drives the zoom mechanism, and a zoom amount storing unit which stores a zoom amount provided by the zoom drive unit, including: an operation signal receiving step which receives a predetermined operation signal; and a zoom control step which controls the zoom drive unit in such a manner as to set an initial zoom condition determined based on the zoom amount stored in the zoom amount storing unit when the operation signal receiving unit receives the predetermined operation signal.

According to this control method of the projector, the zoom control step drives the zoom drive unit in such a manner as to set the initial zoom condition based on the minimum zoom amount and the maximum zoom amount stored in the zoom amount storing unit when the operation signal receiving step receives the predetermined operation signal. In this case, operation starts from the initial zoom condition based on the previous zoom condition stored in the zoom amount storing unit when the zoom mechanism is operated in such a manner as to set a desired zoom condition next time. Thus, the zoom shift amount can be decreased, and the time required for zoom shift can be reduced.

When the projector and the control method of the projector described above are operated under a computer included in the projector, the examples and applications shown herein can be provided by using a program having the associated functions, a recording medium which records the program readable by the computer or other forms. The recording medium may be various types of medium readable by the computer such as flexible disk, CD-ROM, photo-electro-magnetic disk, IC card, ROM cartridge, punch card, printing material on which codes such as bar codes are printed, internal storing device of the projector (memories such as RAM and ROM), and external storing device.

BRIEF DESCRIPTION OF THE DRAWINGS

The invention will be described with reference to the accompanying drawings, wherein like numbers reference like elements.

FIG. 2A shows a zoom condition corresponding to the minimum projection view angle. FIG. 2B shows a zoom condition corresponding to the maximum projection view angle. FIG. 2C shows a zoom condition corresponding to the center projection view angle.

FIG. 3 is a flowchart showing a process performed when the projector is turned on.

FIG. 5A shows a projection condition before zoom control keystone correction process. FIG. 5B shows a projection condition after zoom control keystone correction process.

FIG. 9 is a flowchart showing a process performed when the projector is turned on.

DESCRIPTION OF EXEMPLARY EMBODIMENTS

Exemplary embodiments according to the invention are hereinafter described.

First Embodiment

Figure 1:
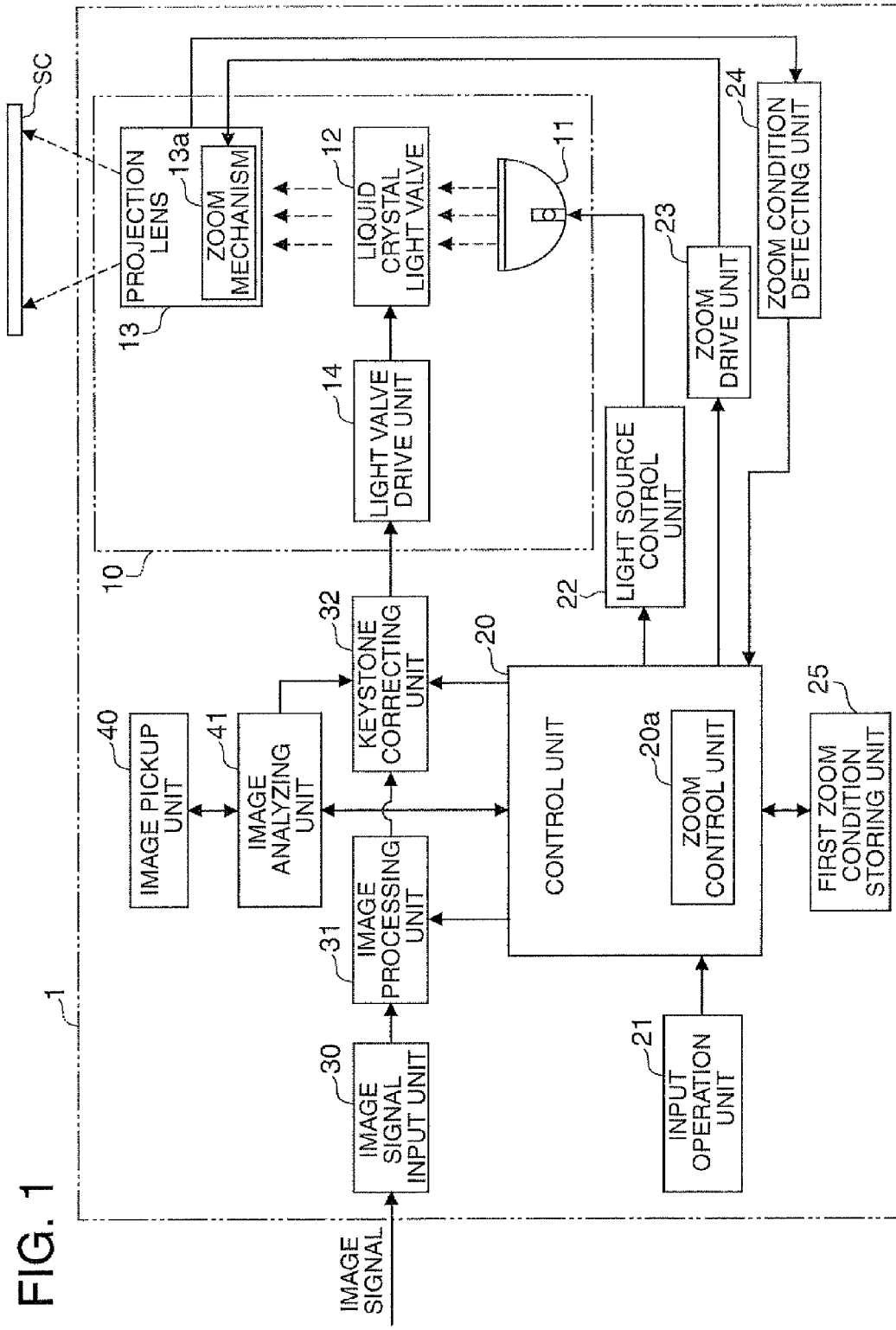
FIG. 1 is a block diagram showing a general structure of a projector according to a first embodiment.

FIG. 1 is a block diagram showing a general structure of a projector 1 according to a first embodiment. The internal structure of the projector 1 is now discussed with reference to FIG. 1.

The projector 1 includes an image projecting unit 10, a control unit 20, an input operation unit 21, a light source control unit 22, a zoom drive unit 23, a zoom condition detecting unit 24, a first zoom condition storing unit 25, an image signal input unit 30, an image processing unit 31, a keystone correcting unit 32, an image pickup unit 40, an image analyzing unit 41, and other components. The control unit 20 also functions as an operation signal receiving unit. FIG. 1 shows a screen SC outside the projector 1.

The image projecting unit 10 has a light source 11 constituted by a discharge type light source such as extra-high pressure mercury lamp and metal halide lamp or a solid light source such as LED (light emitting diode), a liquid crystal light valve 12 as a light modulation device, a projection lens 13, a light valve drive unit 14 for driving the liquid crystal light valve 12.

The liquid crystal light valve 12 is constituted by a transmission type liquid crystal panel having a pair of transparent substrates and liquid crystals sealed between the substrates, and other parts. When driving voltage corresponding to an image signal is applied to each pixel on the liquid crystal light valve 12, each pixel transmits light from the light source 11 with transmissivity corresponding to the image signal.

The light emitted from the light source 11 is modulated while passing through the liquid crystal light valve 12. Then, the modulated light is projected by the projection lens 13 such that an image corresponding to the image signal can be displayed on the screen SC or the like.

The projection lens 13 has a zoom mechanism 13a capable of controlling projection view angle by varying zoom condition.

The control unit 20 has a CPU (central processing unit), a RAM (random access memory) for temporarily storing various types of data, non-volatile memories (not shown) such as mask ROM (read only memory), flash memory, and FeRAM (ferroelectric RAM) to function as a computer. The control unit 20 collectively controls the operation of the projector 1 by the function of the CPU under the control of control programs stored in the non-volatile memories. The control unit 20 has a zoom control unit 20a.

The zoom control unit 20a reads a first zoom condition, that is, an initial zoom amount indicating an initial zoom condition from the first zoom condition storing unit 25. The zoom control unit 20a receives an optimum zoom condition corresponding to automatic zoom control process described later from the image analyzing unit 41 to calculate the optimum zoom amount. The zoom control unit 20a commands the zoom drive unit 23 to drive the zoom mechanism 13a based on these zoom amounts. The zoom control unit 20a also writes a zoom amount indicating the first zoom condition to the first zoom condition storing unit 25. The zoom control unit 20a further receives a zoom amount indicating the zoom condition of the projection lens 13 from the zoom condition detecting unit 24 to judge the zoom condition of the projection lens 13.

The input operation unit 21 has a plurality of keys for issuing various commands to the projector 1 and other parts. The keys of the input operation unit 21 include a "power source key" for turning on and off of the power source, an "automatic zoom key" for performing automatic zoom control process, a "menu key" for switching display and non-display of a menu screen for various settings, a "cursor key" for shifting cursor on the menu screen or for other operations, a "determination key" for determining various settings, and other keys. When the user operates the input operation unit 21, the input operation unit 21 outputs an operation signal corresponding to the operation of the user to the control unit 20. The input operation unit 21 may have a remote controller signal receiving unit (not shown) and a remote controller (not shown) capable of providing remote control. In this case, the remote controller outputs infrared light or the like corresponding to the operation of the user as operation signal, and the remote controller signal receiving unit receives and transmits the operation signal to the control unit 20.

The light source control unit 22 controls supply and stop of power to the light source 11 in response to a command from the control unit 20 to switch between on and off of the light source 11.

The zoom drive unit 23 has a motor, gears and the like, and drives the zoom mechanism 13a under the control of the zoom control unit 20a to change zoom condition of the projection lens 13.

The zoom condition detecting unit 24 detects the zoom condition of the zoom mechanism 13a as zoom amount, and outputs the zoom amount as the detection result to the zoom control unit 20a. In this embodiment, the zoom amount is obtained by detecting the change quantity of the zoom mechanism 13a using an encoder or the like. Alternatively, the zoom amount may be detected based on the number of steps of a stepping motor included as the motor of the zoom drive unit 23.

The first zoom condition storing unit 25 is constituted by a nonvolatile memory, and stores the zoom amount corresponding to the first zoom condition as the initial zoom amount. The stored zoom amount is read by the zoom control unit 20a. The zoom amount of the first zoom condition may be measured and stored for each product (projector). In this case, an accurate zoom amount corresponding to an individual product can be stored.

Figure 2A:
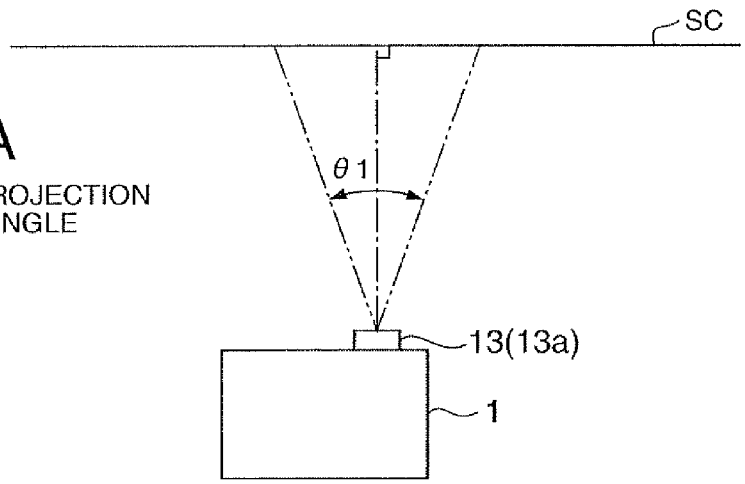
FIGS. 2A through 2C show projection view angles of the projector as viewed from above.
Figure 2B:
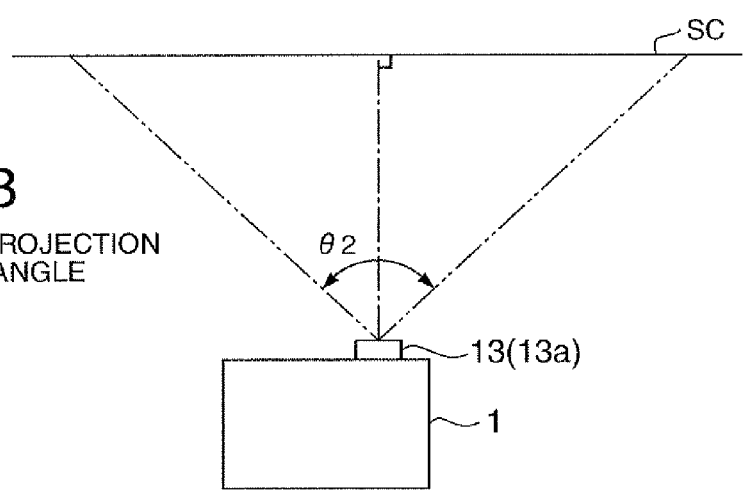
Figure 2C:
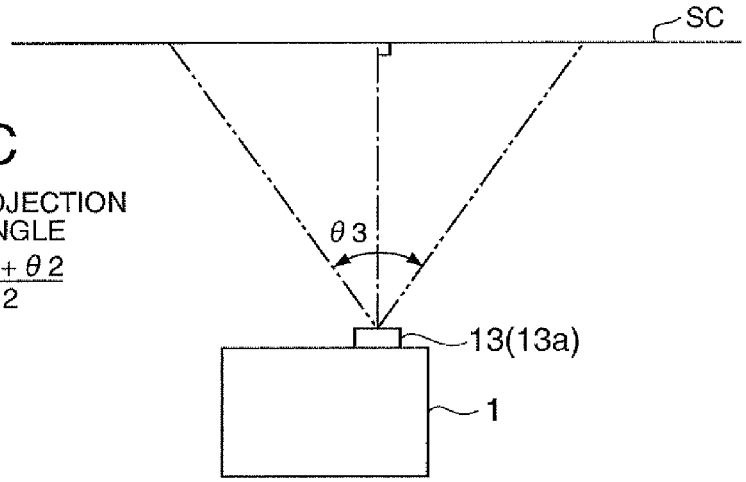

The first zoom condition, more specifically, the zoom condition corresponding to the center angle between the projection view angles at the tele-end and wide-end of the projection lens 13 is now discussed. FIGS. 2A through 2C are views showing projection view angles of the projector 1 as viewed from the above. FIG. 2A shows zoom condition corresponding to the minimum projection view angle (tele-end). FIG. 2B shows zoom condition corresponding to the maximum projection view angle (wide end). FIG. 2C shows zoom condition corresponding to the center projection view angle. In this embodiment, the projection view angles are angles in the horizontal direction for simplifying the explanation.

When the zoom mechanism 13a of the projection lens 13 of the projector 1 is in the minimum zoom condition (tele-end) in the controllable range, the projection view angle becomes $\theta 1$ as shown in FIG. 2A. When the zoom mechanism 13a of the projection lens 13 of the projector 1 is in the maximum zoom condition (wide-end) in the controllable range, the projection view angle becomes $\theta 2$ as shown in FIG. 2B.

In this case, a center projection view angle $\theta 3$ between the minimum (tele-end) projection view angle $\theta 1$ and the maximum (wide-end) projection view angle $\theta 2$ in the controllable range of the zoom mechanism 13a of the projector 1 can be calculated by the following equation (1) as shown in FIG. 2C.

$$\theta 3 = (\theta 1 + \theta 2)/2 \quad (1)$$

The condition corresponding to the projection view angle $\theta 3$ calculated by the equation (1) is referred to as the first zoom condition.

The first zoom condition, that is, the zoom amount when the projection view angle is $\theta 3$ is stored in the first zoom condition storing unit 25.

Returning to FIG. 1, the image signal input unit 30 has various types of image input terminals for connection with an external image supply device (not shown) such as personal computer and video reproduction device via a cable, and receives image signals from the image supply device. The image signal input unit 30 converts the received image signals into image data in the form allowed to be processed by the image processing unit 31, and outputs the image data to the image processing unit 31.

The image processing unit 31 performs various types of image quality adjustments including controls over brightness, contrast, sharpness, and tone, and gamma correction for the image data received from the image signal input unit 30 based on an instruction of the control unit 20. The image processing unit 31 superimposes OSD (on screen display) images on the image data as necessary. The image processing unit 31 outputs the adjusted and processed image data to the keystone correcting unit 32.

The keystone correcting unit 32 corrects inputted image data to prevent trapezoidal distortion produced when the projector 1 is inclined to the screen SC for image projection. Information for the correction is inputted from the control unit 20 or the image analyzing unit 41. Then, the image data thus corrected is outputted to the light valve drive unit 14. When the information for correcting trapezoidal distortion is absent, the image data received from the image processing unit 31 is outputted to the light valve drive unit 14 as it is.

The light valve drive unit 14 drives the liquid crystal light valve 12 according to the received image data. As a result, an image corresponding to the image data can be projected from the image projecting unit 10 onto the screen SC.

The image pickup unit 40 has a CCD camera, and is disposed on the side surface where the projection lens 13 of the projector 1 is provided. The image pickup unit 40 shoots the image projected on the screen SC in response to a command from the image analyzing unit 41, and outputs the shot image to the image analyzing unit 41. The image pickup unit 40 is not limited to the CCD camera but may be other image pickup devices.

The image analyzing unit 41 analyzes image data of the image shot by the image pickup unit 40 in response to a command from the control unit 20 to perform processes for "detection of the entire projection area frame and the screen frame", "projective transformation of the entire projection area frame and the screen frame", "calculation of optimum zoom condition", "output of information for keystone correction" and the like as processes associated with the automatic zoom control process. The details of the automatic zoom control process will be described later.

Figure 3:
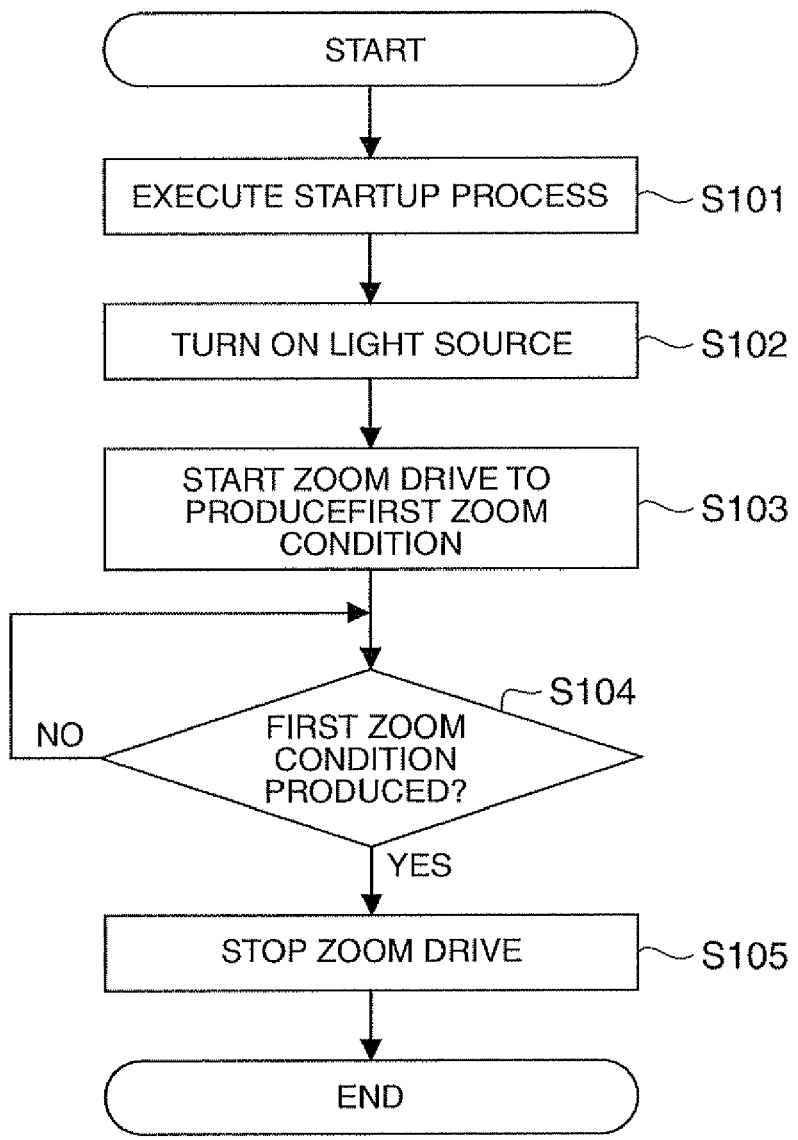

Operation performed when the power source of the projector 1 is turned on is now discussed. FIG. 3 is a flowchart showing the process performed when the projector 1 is turned on.

When a power ON operation signal for turning on the projector 1 is inputted by pressing the power source key of the input operation unit 21, the control unit 20 executes startup process (step S101). In this embodiment, the startup process initializes CPU and memories such as RAM. Other software and hardware and the like are also initialized. Then, the control unit 20 commands the light source control unit 22 to turn on the light source 11 (step S102).

Subsequently, the zoom control unit 20a reads the initial zoom amount indicating the first zoom condition from the first zoom condition storing unit 25, and starts actuation of the zoom mechanism 13a by using the zoom drive unit 23 to set the first zoom condition (step S103). Then, the zoom control unit 20a judges whether the first zoom condition has been established or not (step S104). The zoom control unit 20a keeps waiting until the first zoom condition is established (step S104: NO). When the first zoom condition is established (step S104: YES), the zoom control unit 20a stops operation of the zoom drive unit 23 (step S105). Then, the process at the time of power ON of the projector 1 ends.

As described above, the zoom mechanism 13a is set to the first zoom condition by the zoom drive unit 23 when the power source of the projector 1 is turned on. That is, the zoom condition having the center view angle $\theta 3$ between the minimum (tele-end) projection view angle $\theta 1$ and the maximum (wide end) projection view angle $\theta 3$ is attained.

The automatic zoom control process performed by the projector 1 is now discussed. The automatic zoom control process explained herein is similar to zoom control keystone correction process disclosed in JP-A-2006-5534. Thus, only general explanation is given herein.

The projector 1 can perform zoom control keystone correction process which automatically achieves zoom control and keystone correction. The zoom control is a process for controlling zoom condition such that the largest possible projection image can be displayed within the screen SC. The keystone correction is a process for correcting trapezoidal distortion of the image displayed on the screen SC. The zoom control keystone correction process is initiated when the user presses the automatic zoom key provided on the input operation unit 21. Alternatively, the zoom control keystone correction process may be automatically performed at the time of turning on the power source or input of the image signal, for example.

Figure 4:
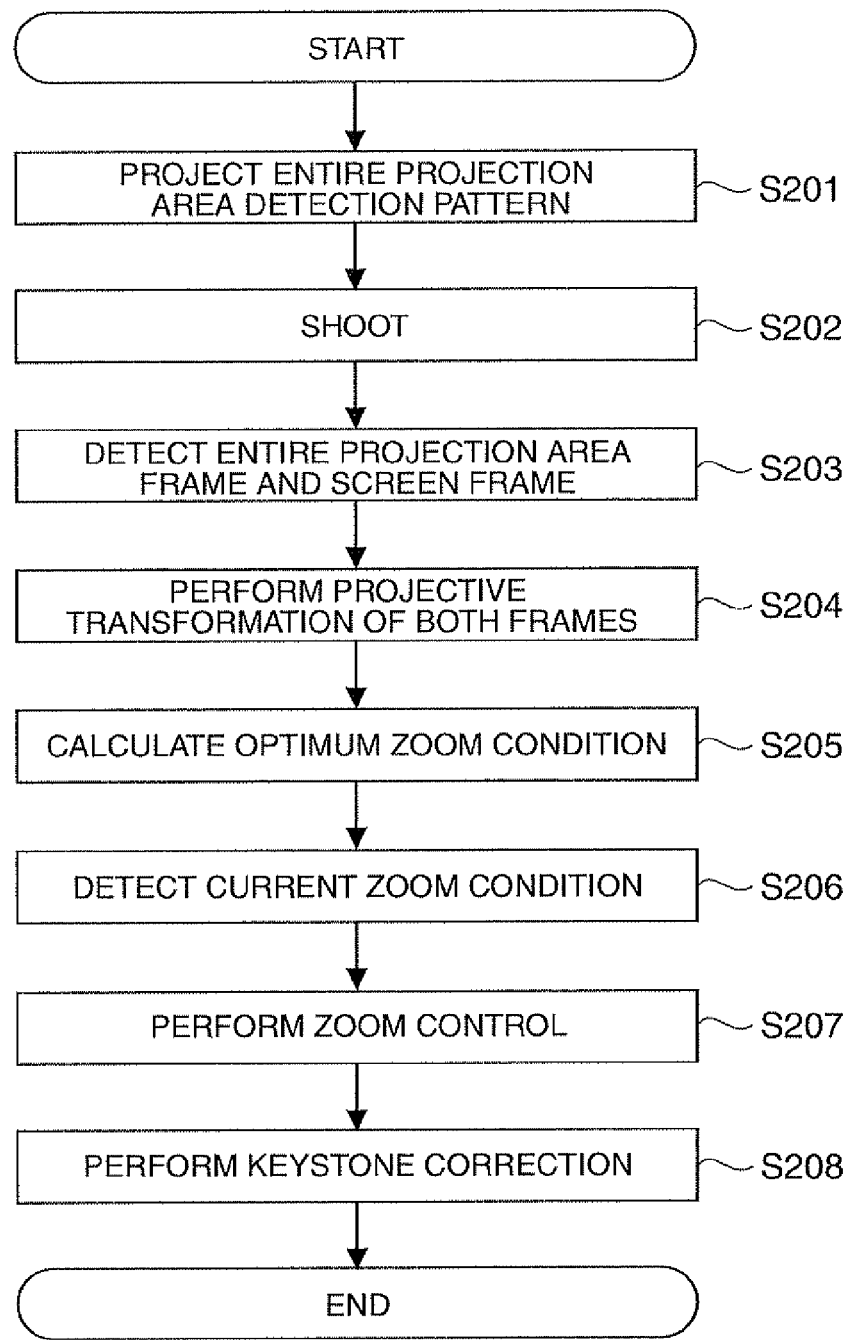
FIG. 4 is a flowchart showing a flow of zoom control keystone correction process.

FIG. 4 is a flowchart showing flow of zoom control keystone correction process (similar to a flowchart shown in FIG. 3 of JP-A-2006-5534, but step numbers are different).

In step S201, the image processing unit 31 projects an entire projection area detection pattern. The entire projection area refers to an area on the screen SC or on the wall surface at the back of the screen SC to which image light corresponding to the entire image forming area of the liquid crystal light valve 12 is projected. The image forming area refers to an area on the panel surface of the liquid crystal light valve 12 on which image data signal inputted to the light valve drive unit 14 can be displayed.

In step S202, the image pickup unit 40 shoots the entire projection area and the screen SC, produces a shot image showing the entire projection area and the screen SC, and stores the shot image in a shot image memory (not shown). The optical axis of the lens of the CCD camera included in the image pickup unit 40 extends substantially in parallel with the optical axis of the projection lens 13. However, the optical axis of the lens of the CCD camera and the optical axis of the projection lens 13 are not accurately parallel with each other. The entire projection area frame is slightly distorted in trapezoidal shape.

In step S203, the image analyzing unit 41 analyzes image data on the shot image to detect the entire projection area frame and the screen frame. The entire projection area frame refers to the outer periphery of the entire projection area to which the image light corresponding to the entire image forming area on the panel surface of the liquid crystal light valve 12 is projected. The screen frame refers to a black frame along the outer periphery of the screen SC. The entire projection area frame and the screen frame are detected by measuring contrast ratio of the shot image and extracting pixels having high contrast ratio.

In step S204, the image analyzing unit 41 performs projective transformation of the entire projection area frame and the screen frame. The projective transformation compensates for the difference between the optical axis of the lens of the CCD camera included in the image pickup unit 40 and the optical axis of the projection lens 13.

In step S205, the image analyzing unit 41 calculates the optimum zoom condition. The optimum zoom condition refers to a zoom condition corresponding to the largest possible image on the screen SC in keystone correction while preventing lowering of resolution of an effective panel image formed on the panel surface of the liquid crystal light valve 12.

Figure 5A:
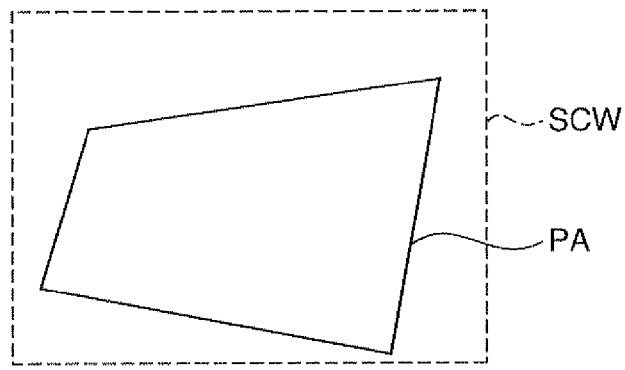
FIGS. 5A and 5B show projection conditions of an image on a screen.
Figure 5B:
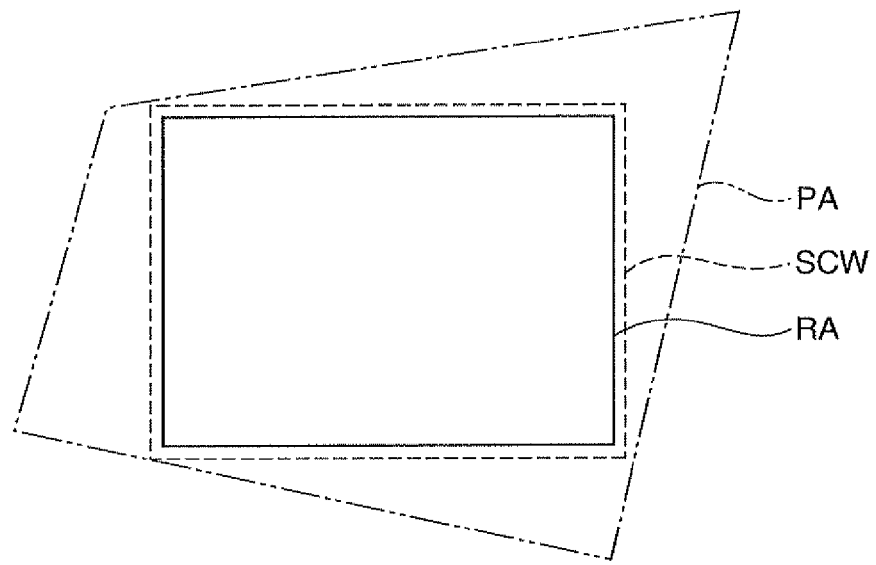

FIGS. 5A and 5B show image projection condition on the screen. FIG. 5A shows projection condition before zoom control keystone correction process, and FIG. 5B shows projection condition after zoom control keystone correction process. The optimum zoom condition is a zoom condition where an entire projection area PA contains the screen SC with the outer periphery of the entire projection area PA contacting with the outer periphery of the screen SC (screen frame SCW) as shown in FIG. 5B. The entire projection area frame in this condition is referred to as an entire projection area frame after optimum zoom control. After the entire projection area frame after optimum zoom control is obtained, expansion magnification from the entire projection area frame (optimum magnification Mb) is calculated.

Returning to FIG. 4, the zoom condition detecting unit 24 detects the current zoom condition of the projection lens 13 in step S206. A zoom amount corresponding to the detected current zoom condition is represented by Zp.

In step S207, the zoom control unit 20a commands the zoom drive unit 23 to perform zoom control. The zoom control is carried out such that the zoom amount becomes a value corresponding to the optimum zoom condition (hereinafter referred to as "optimum zoom amount"). The optimum zoom amount is obtained by multiplying the current zoom amount Zp calculated in step S206 by the optimum magnification Mb calculated in step S205.

In step S208, the keystone correction unit 32 performs keystone correction based on information for keystone correction inputted from the image analyzing unit 41. The keystone correction in this embodiment forms an effective panel image only on a region (image forming area after correction) of the image forming area on the liquid crystal light valve 12 corresponding to a projection area after correction RA contained in the entire projection area PA within the screen SC so as to project an image only on the projection area after correction RA. A total black image is formed on a region other than the image forming area after correction in the image forming area so as to prevent transmission of light emitted from the light source 11.

After the zoom control keystone correction process, the projection area after correction RA is contained within the screen frame SCW of the screen SC as shown in FIG. 5B. Thus, the optimum zoom condition and the keystone correction are achieved. In this case, image light is not projected on a region other than the projection area after correction RA in the entire projection area PA. FIG. 5A shows an image on the screen before the zoom control keystone correction process.

As described above, the projector 1 according to this embodiment performs automatic zoom control process (zoom control keystone correction process). Since the largest possible image forming area after correction is formed in the image forming area of the liquid crystal light valve 12, lowering of the resolution of the effective panel image can be prevented.

According to the first embodiment, the following advantages are offered.

That is, when the power source is turned on, the projector 1 is set to the first zoom condition. By execution of the automatic zoom control process, the zoom condition varies from the first zoom condition to the optimum zoom condition. That is, the zoom condition varies from the zoom condition corresponding to the minimum (tele-end) projection view angle θ1, the maximum (wide end) projection view angle θ2, and the center projection view angle θ3 as the starting position until the optimum zoom condition. Thus, the change of the projection view angle becomes equal to or lower than a value Δθ calculated by the following equation (2), achieving reduction of the change of the angle. Also, the operation time for operating the zoom mechanism 13a decreases.

$$\Delta\theta = (\theta 2 - \theta 1)/2 \qquad (2)$$

Second Embodiment

A second embodiment of the invention is now discussed.

A projector according to the second embodiment has a structure similar to that of the projector 1 in the first embodiment except for the timing for driving the zoom drive unit 23 to set to the first zoom condition. In the first embodiment, the first zoom condition is set when the projector 1 is turned on. According to this embodiment, however, the first zoom condition is set not when the projector is turned on but when the projector is turned off. The automatic zoom control process (zoom control keystone correction process) performed in this embodiment is similar to that in the first embodiment.

Figure 6:
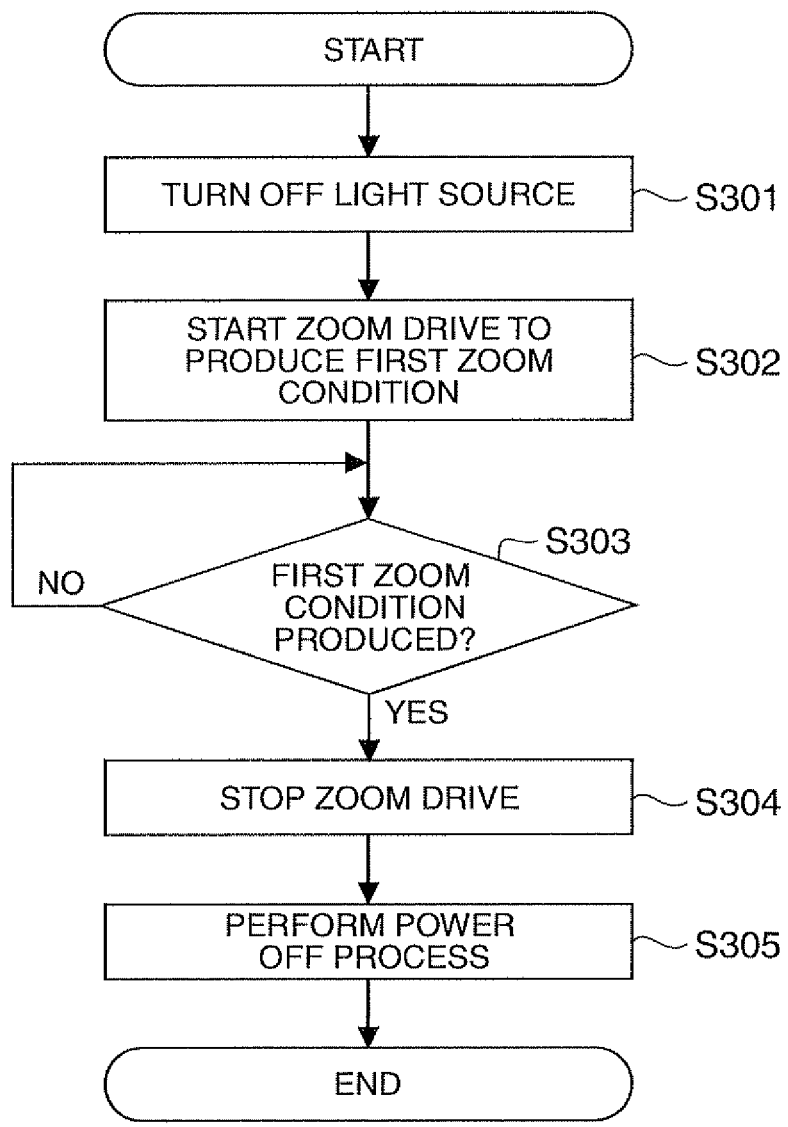
FIG. 6 is a flowchart showing a process performed when the projector is turned off according to second and sixth embodiments.

The operation performed when the projector is turned off is now discussed. FIG. 6 is a flowchart showing the process performed when the projector is turned off.

When a power OFF operation signal of the projector is inputted by press of the power source key of the input operation unit 21, the control unit 20 commands the light source control unit 22 to turn off the light source 11 (step S301).

Then, the zoom control unit 20a reads the zoom amount of the first zoom condition from the first zoom condition storing unit 25 to start actuation of the zoom mechanism 13a by using the zoom drive unit 23 such that the first zoom condition can be established (step S302). Then, the zoom control unit 20a judges whether the first zoom condition has been established or not (step S303). The zoom control unit 20a keeps waiting until the first zoom condition is established (step S303: NO). When the first zoom condition is established (step S303: YES), the zoom control unit 20a stops operation of the zoom drive unit 23 (step S304).

Then, the control unit 20 executes power OFF process (step S305), and the process performed when the projector is turned off ends. In this embodiment, the power OFF process is a process performed when the projector is turned off, and thus contains processes by software and hardware and the like associated with power OFF.

As described above, the zoom mechanism 13a is set to the first zoom condition by the zoom drive unit 23 when the projector is turned off. That is, the zoom condition of the center projection view angle θ3 between the minimum (tele-end) projection view angle θ1 and the maximum (wide-end) projection view angle θ2 is established.

According to the second embodiment, the following advantages are offered.

First, when the power source is turned off, the projector is set to the first zoom condition. By execution of the automatic zoom control process (zoom control and keystone correction), the zoom condition varies from the first zoom condition to the optimum zoom condition. That is, the zoom condition varies from the center projection view angle θ3 as the starting position which is the center angle between the minimum (tele-end) projection view angle θ1 and the maximum (wide end) projection view angle θ2 to the optimum zoom condition. Thus, the change of the projection view angle becomes equal to or lower than the value Δθ calculated by the equation (2), achieving reduction of the change of the angle. Also, the operation time for operating the zoom mechanism 13a decreases.

Second, the projector is set to the first zoom condition when the power source is turned off. Thus, the necessity for setting the first zoom condition when the power source is tuned on is eliminated. Accordingly, the time required for performing the initial process when the projector is turned on can be reduced.

Third Embodiment

A third embodiment of the invention is hereinafter described.

A projector 3 according to the third embodiment has a zoom amount storing unit 26 in place of the first zoom condition storing unit 25 of the first embodiment. Moreover, the process performed by the zoom control unit 20a is different. Other parts are similar to those in the first embodiment. The automatic zoom control process (zoom control keystone correction process) is also similar to that in the first embodiment.

Figure 7:
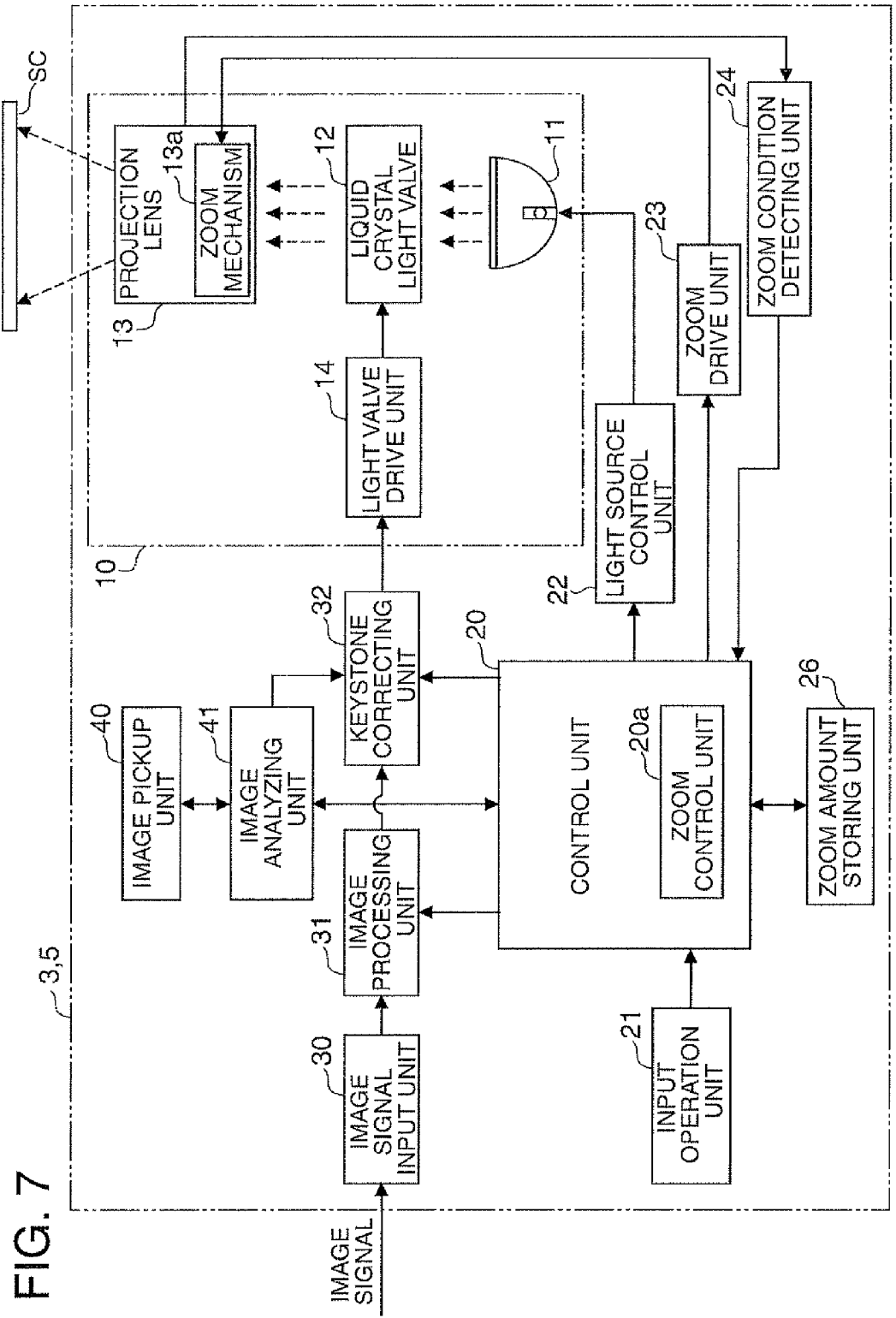
FIG. 7 is a block diagram showing a general structure of a projector according to second and sixth embodiments.

FIG. 7 is a block diagram showing the general structure of the projector 3 according to the third embodiment. The difference in the internal structure between the projector 3 and the projector 1 is now discussed with reference to FIG. 7.

The zoom amount storing unit 26 has non-volatile memory to store the minimum and the maximum of the zoom amount provided by the zoom drive unit 23 in response to the input operation by the user. The zoom amount storing unit 26 also stores the minimum value and the maximum value of the zoom amount controllable by the zoom mechanism 13a as default values.

Figure 8:
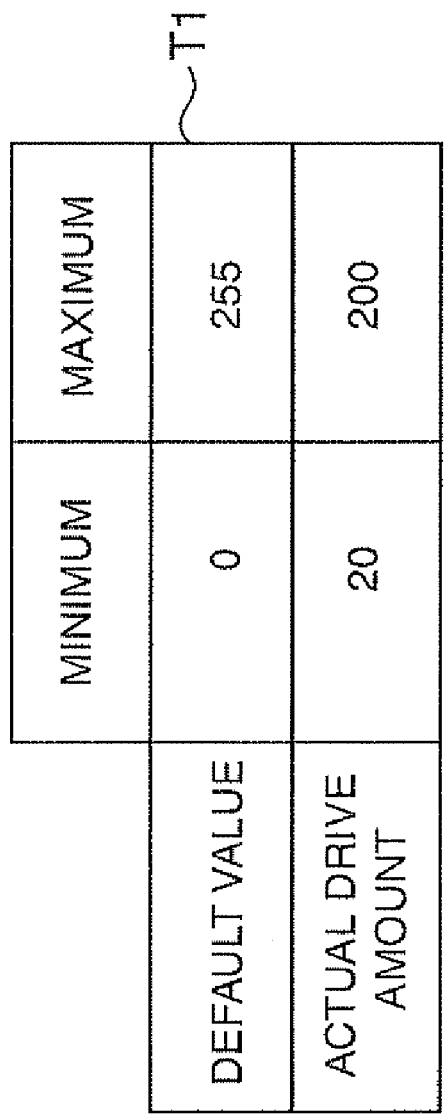
FIG. 8 shows an area structure of a zoom amount storing unit.

FIG. 8 shows an area structure of the zoom amount storing unit 26. As shown in FIG. 8, a memory area T1 of the zoom amount storing unit 26 stores the minimum value (tele-end value) and the maximum value (wide end value) of the zoom amount as default values, and the minimum value and the maximum value of the zoom amount as actual drive amounts at the time of zoom control. In this case, the zoom control may be either automatic zoom control process or manual zoom control. The default values are stored in advance.

Returning to FIG. 7, the zoom control unit 20a reads the zoom amount stored in the zoom amount storing unit 26 to calculate the initial zoom amount indicating a second zoom condition. The zoom control unit 20a also receives the optimum zoom condition from the image analyzing unit 41 to calculate the optimum zoom amount. The zoom control unit 20a controls the zoom drive unit 23 based on these zoom amounts to drive the zoom mechanism 13a.

The zoom control unit 20a receives the zoom amount indicating the zoom condition from the zoom condition detecting unit 24 when the zoom control is executed. When the zoom amount is smaller than the minimum value of the actual drive amount stored in the zoom amount storing unit 26, the minimum value of the actual drive amount of the zoom amount storing unit 26 is replaced with the detected zoom amount. That is, the minimum value of the actual drive amount is updated. When the zoom amount is larger than the maximum value of the actual drive amount stored in the zoom amount storing unit 26, the maximum value of the actual drive amount of the zoom amount storing unit 26 is replaced with the detected zoom amount. That is, the maximum value of the actual drive amount is updated.

Figure 9:
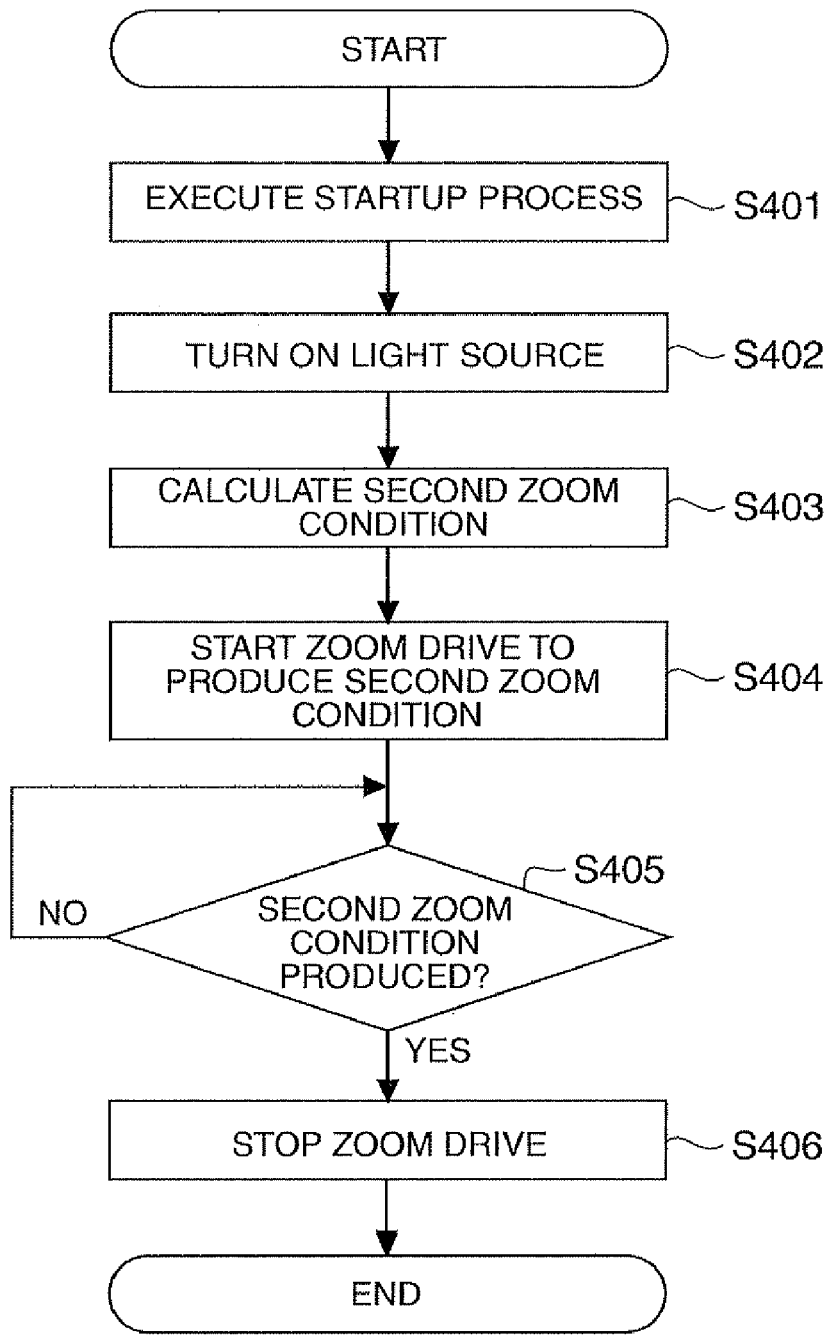

The operation of the projector 3 when the power source is turned on is now discussed. FIG. 9 is a flowchart showing the process performed when the projector 3 is turned on.

When a power ON operation signal is inputted to the projector 3 by press of the power source key of the input operation unit 21, the control unit 20 performs startup process (step S401). Then, the control unit 20 commands the light source control unit 22 to turn on the light source 11 (step S402).

Subsequently, the zoom control unit 20a reads the minimum value and the maximum value of the actual drive amount from the zoom amount storing unit 26 to calculate the center value (average value) as a zoom amount indicating the second zoom condition (step S403). When the actual drive value is absent, the minimum and the maximum of default values in the zoom amount storing unit 26 are used. Then, the zoom control unit 20a starts operation of the zoom mechanism 13a by using the zoom drive unit 23 such that the second zoom condition is established (step S404). Thereafter, the zoom control unit 20a judges whether the second zoom condition has been established or not (step S405). The zoom control unit 20a keeps waiting until the second zoom condition is established (step S405: NO). When the second zoom condition is established (step S405: YES), the zoom control unit 20a stops operation of the zoom drive unit 23 (step S406). Then, the process at the time of power on of the projector 3 ends.

As described above, the zoom mechanism 13a is set to the second zoom condition by using the zoom drive unit 23 when the projector 3 is turned on. That is, the zoom condition becomes a condition corresponding to the central zoom amount between the minimum zoom value and the maximum zoom value of the actual drive amount.

According to the third embodiment, the following advantages are offered.

(1) The projector 3 is set to the second zoom condition when the power source is turned on. Thus, the zoom condition varies from the second zoom condition to the optimum zoom condition by execution of the automatic zoom control process. That is, the zoom condition varies from the zoom condition corresponding to the central zoom amount between the minimum zoom value and the maximum zoom value of the actual drive amount as the starting position until the optimum zoom condition. In this case, the previous drive amount (zoom range used) by the user is reflected, and the zoom is shifted from the condition close to the zoom condition preferred by the user. Thus, the zoom shift amount can be decreased, and time required for zoom operation can be reduced.

Fourth Embodiment

A fourth embodiment is hereinafter described.

A structure of a projector according to the fourth embodiment is similar to that of the projector 3 in the third embodiment. The difference between this embodiment and the third embodiment is only the timing for calculating and setting the second zoom condition. According to the third embodiment, the second zoom condition is calculated and set when the projector 3 is turned on. In this embodiment, however, the second zoom condition is calculated and set not when the projector is turned on but when the projector is turned off. The automatic zoom control process (zoom control keystone correction process) is similar to that of the first embodiment.

Figure 10:
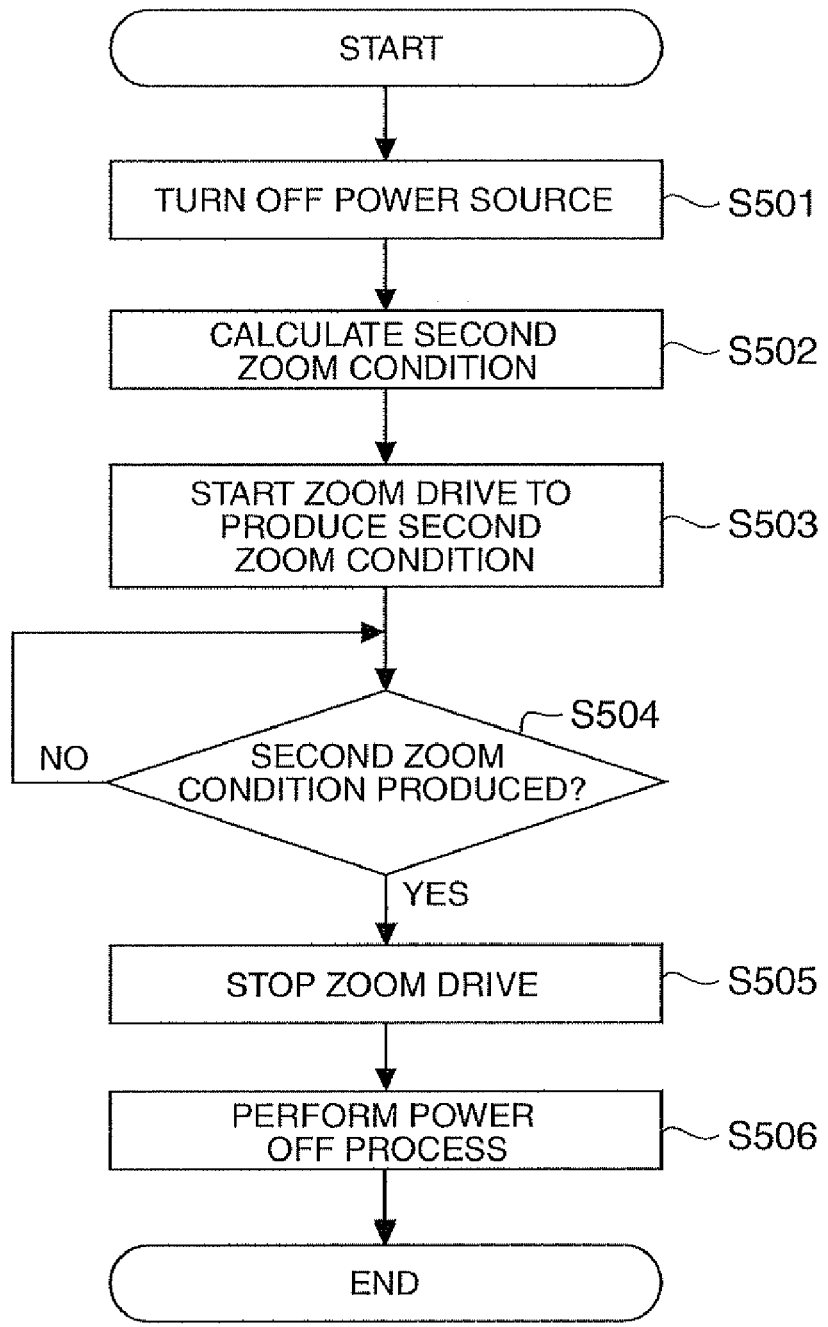
FIG. 10 is a flowchart showing a process performed when the projector is turned off according to a fourth embodiment.

The operation of the projector when the power source is turned off is now discussed. FIG. 10 is a flowchart showing the process performed when the projector is turned off.

When a power OFF operation signal is inputted to the projector by press of the power source key of the input operation unit 21, the control unit 20 commands the light source control unit 22 to turn off the light source 11 (step S501).

Then, the zoom control unit 20a reads the minimum value and the maximum value of the actual drive amount from the zoom amount storing unit 26, and calculate the center value (average value) as the zoom amount indicating the second zoom condition (step S502). When the actual drive amount is absent, the minimum and the maximum of default values stored in the zoom amount storing unit 26 are used. Then, the zoom control unit 20a starts operation of the zoom mechanism 13a by using the zoom drive unit 23 such that the second zoom condition is established (step S503). Thereafter, the zoom control unit 20a judges whether the second zoom condition has been established or not (step S504). The zoom control unit 20a keeps waiting until the second zoom condition is established (step S504: NO). When the second zoom condition is established (step S504: YES), the zoom control unit 20a stops operation of the zoom drive unit 23 (step S505).

Then, the control unit 20 performs power OFF process (step S506), and the process performed when the projector is turned off ends.

As described above, the zoom mechanism 13a is set to the second zoom condition by the zoom drive unit 23 when the projector is turned off. Thus, the zoom condition based on the center zoom value between the minimum zoom value and the maximum zoom value of the actual drive amount is obtained.

According to the fourth embodiment, the following advantages are offered.

First, the projector is set to the second zoom condition when the power source is turned off. Thus, the zoom condition varies from the second zoom condition to the optimum zoom condition by execution of the automatic zoom control process. That is, the zoom condition varies from the zoom condition corresponding to the center zoom amount between the minimum zoom value and the maximum zoom value of the actual drive amount as the starting position until the optimum zoom condition. In this case, the previous drive amount (zoom range used) by the user is reflected, and the zoom is shifted from the condition close to the zoom condition preferred by the user. Thus, the zoom shift amount can be decreased, and time required for zoom operation can be reduced.

Second, since the projector is set to the second zoom condition at the time of power OFF, the necessity for setting the second zoom condition at the next power ON can be elimi-

Fifth Embodiment

A fifth embodiment is hereinafter described.

A structure of a projector 5 in the fifth embodiment is similar to that of the projector 3 in the third embodiment.

FIG. 7 is a block diagram showing the general structure of the projector 5 in the fifth embodiment. The difference in the internal structure between the projector 5 and the projector 1 is now discussed with reference to FIG. 7.

The zoom amount storing unit 26 has non-volatile memory to store the minimum value and the maximum value of the zoom amount indicating the zoom condition provided by the zoom drive unit 23. The zoom amount storing unit 26 also stores the minimum value and the maximum value of the zoom amount controllable by the zoom mechanism 13*a* as default values.

The zoom amount storing unit 26 further stores a zoom amount which achieves a condition where a first zoom operation time required for setting the stored minimum zoom amount by the zoom mechanism 13*a* actuated by the zoom drive unit 23 coincides with a second zoom operation time required for setting the stored maximum zoom amount by the zoom mechanism 13*a* actuated by the zoom drive unit 23 as the initial zoom amount. The initial zoom amount corresponds to the initial zoom condition of the projection lens 13. The stored initial zoom amount is read and updated by the zoom control unit 20*a*.

The projector 5 is set to the initial zoom condition when the power source is turned on. The process performed when the projector 5 is turned on is similar to that in the first embodiment shown in the flowchart in FIG. 3. Thus, the figure and explanation are not shown herein.

According to the fifth embodiment, the following advantages are offered.

That is the power source is turned on, the projector 5 is set to the initial zoom condition. By execution of the automatic zoom control process, the zoom condition varies from the third zoom condition to the optimum zoom condition. That is, the zoom condition varies from the zoom condition in which the first zoom operation time coincides with the second zoom operation time as the starting position until the optimum zoom condition. Thus, the time required for the zoom control becomes the first zoom operation time (=second zoom operation time) or shorter, and the zoom control time decreases.

Sixth Embodiment

A sixth embodiment is now described.

A structure of a projector according to the sixth embodiment is similar to that of the projector 5 in the fifth embodiment. The difference between this embodiment and the fifth embodiment is only the timing for setting the initial zoom condition by driving the zoom drive unit 23. According to the fifth embodiment, the initial zoom condition is set when the projector 5 is turned on. In this embodiment, however, the initial zoom condition is set not when the projector is turned on but when the projector is turned off. The automatic zoom control process (zoom control keystone correction process) is similar to that of the first embodiment.

The process performed when the projector is turned off is similar to that shown in the flowchart according to the second embodiment shown in FIG. 6, and thus the figure and explanation are not shown herein.

According to the sixth embodiment, the following advantages are offered.

First, the projector is set to the initial zoom condition when the power source is turned off. By execution of the automatic zoom control process, the zoom condition varies from the initial zoom condition to the optimum zoom condition. That is, the zoom condition varies from the zoom condition in which the first zoom operation time coincides with the second zoom operation time as the starting position until the optimum zoom condition. Thus, the time required for the zoom control becomes the first zoom operation time (=second zoom operation time) or shorter, and the zoom control time decreases.

Second, since the projector is set to the initial zoom condition when the power source is turned off, the necessity for setting the initial zoom condition at the next power ON is eliminated. Thus, the time required for initial process performed when the projector is turned on can be reduced.

Seventh Embodiment

A seventh embodiment is now described.

A structure of a projector 7 according to the seventh embodiment includes a third zoom condition storing unit 27 in place of the first zoom condition storing unit 25 in the first embodiment. Moreover, the process performed by the zoom control unit 20*a* in the seventh embodiment is different from that in the first embodiment. Other parts are similar to those in the first embodiment. The automatic zoom control process (zoom control keystone correction process) is similar to that of the first embodiment.

Figure 11:
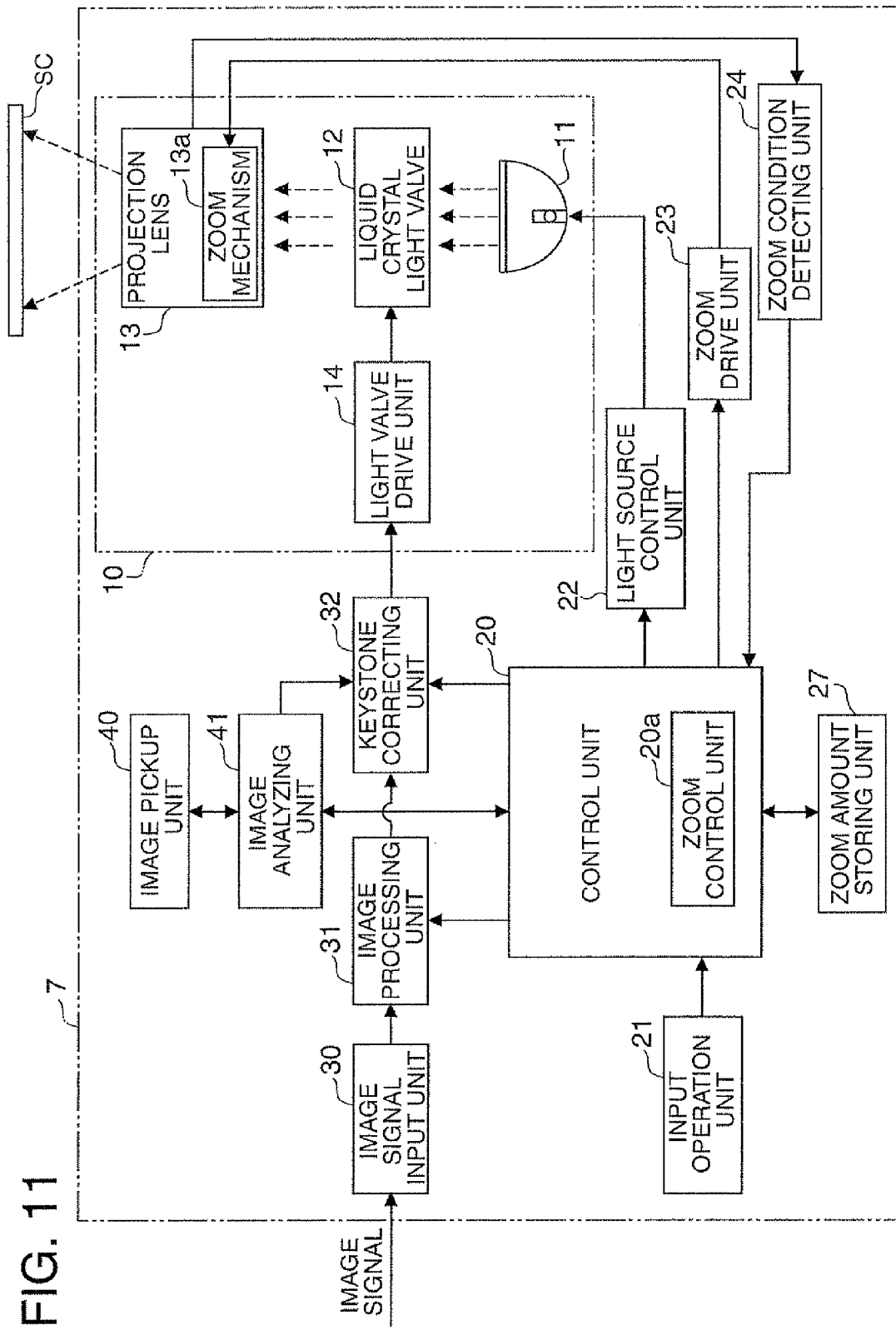
FIG. 11 is a block diagram showing a general structure of a projector according to seventh and eighth embodiments.

FIG. 11 is a block diagram showing the general structure of the projector 7 according to the seventh embodiment. The difference in the internal structure between the projector 7 and the projector 1 is now discussed with reference to FIG. 11.

The third zoom condition storing unit 27 has non-volatile memory to store a zoom amount indicating the latest zoom condition provided by the zoom drive unit 23 as the initial zoom amount. The initial zoom amount corresponds to the initial zoom condition of the projection lens 13. The third zoom condition storing unit 27 stores the center value between the minimum and the maximum zoom amounts controllable by the zoom mechanism 13*a* as the default value of the initial zoom amount. The stored initial zoom amount is read and updated by the zoom control unit 20*a*.

The projector 7 is set to the initial zoom condition when the power source is turned on. The process performed when the projector 7 is turned on is similar to the flowchart of the process in the first embodiment shown in FIG. 3, and the explanation and the figure are not shown herein.

According to the seventh embodiment, the following advantages are offered.

That is, projector 7 is set to the initial zoom condition when the power source is turned on. By execution of the automatic zoom control process, the zoom condition varies from the third zoom condition to the optimum zoom condition. That is, the zoom condition varies from the zoom condition in which the first zoom operation time coincides with the second zoom operation time as the starting position until the optimum zoom condition. Thus, the time required for the zoom control becomes the first zoom operation time (=second zoom operation time) or shorter, and the zoom control time decreases.

Eighth Embodiment

An eighth embodiment is hereinafter described.

The structure of the projector 7 according to the eighth embodiment is similar to that of the projector 7 in the seventh embodiment. The difference between the eighth embodiment and the seventh embodiment is only the timing for setting the initial zoom condition by driving the zoom drive unit 23. According to the seventh embodiment, the initial zoom condition is set when the projector 7 is turned on. In this embodiment, however, the initial zoom condition is not set when the projector 7 is turned on. When the projector 7 is turned on, a zoom amount corresponding to the zoom condition when the projector 7 is turned off is stored in the third zoom condition storing unit 27 with the setting of the current zoom condition maintained. The automatic zoom condition process (zoom control keystone correction process) is similar to that in the first embodiment.

According to the eighth embodiment, the projector 7 is set to the initial zoom condition when the power source is turned off. Since the initial zoom condition has been already set at the time of next use of the projector 7, the zoom control time required until the optimum zoom condition can be reduced.

It is possible to drive the zoom drive unit 23 such that the initial zoom amount, that is, the third zoom condition can be produced when the initial zoom amount read from the third zoom condition storing unit 27 does not coincide with the current zoom condition based on comparison after turning on the power source similarly to the eighth embodiment. According to this structure, the projection lens 13 can be set to the initial zoom condition based on the initial zoom amount read from the third zoom condition storing unit 27 even when the zoom condition of the projection lens 13 is changed for some reason under the OFF condition of the projector 7.

The invention is not limited to the embodiments described above. Thus, various changes and improves including the following modifications may be made.

MODIFIED EXAMPLE 1

According to the first and second embodiments, the first zoom condition is the zoom condition corresponding to the center projection view angle between the minimum projection view angle and the maximum projection view angle. However, the first zoom condition may be a zoom condition providing an angle close to the center projection view angle between the minimum projection view angle and the maximum projection view angle. In this case, similar advantages are offered.

MODIFIED EXAMPLE 2

According to the third and fourth embodiments, the second zoom condition is the zoom condition based on the center zoom value between the minimum zoom value and the maximum zoom value of the actual drive amount. However, the second zoom condition may be zoom condition corresponding to a zoom amount close to the center value between the minimum zoom value and the maximum zoom value of the actual drive amount. In this case, similar advantages are offered.

MODIFIED EXAMPLE 3

According to the fifth and the sixth embodiments, the third zoom condition is the zoom condition in which the first zoom operation time coincides with the second zoom operation time. However, the third zoom condition may be a zoom condition close to the zoom condition in which the first zoom drive time coincides with the second zoom operation time. In this case, similar advantages are offered.

MODIFIED EXAMPLE 4

According to the first through sixth embodiments, the automatic zoom control process (zoom control and keystone correction process) is performed after the projector is set to the predetermined zoom condition (first zoom condition, second zoom condition, or the third zoom condition). However, the zoom control may be performed not automatically but manually by the user. In this case, the projection view angle change quantity, the zoom shift, and the operation time of the zoom mechanism associated with the zoom control can be reduced by setting the predetermined zoom condition as the starting position even when the zoom control is manually performed.

MODIFIED EXAMPLE 5

According to the first through sixth embodiments, the input operation unit 21 is constituted by buttons provided on the projector main body. However, the input operation unit 21 may be IP network communication unit (not shown) for transmitting and receiving operation signals or the like to and from the projector, RS-232C communication unit (not shown), USB (universal serial bus) communication unit (not shown), or others.

MODIFIED EXAMPLE 6

According to the first through sixth embodiments, the light modulation device is the transmission type liquid crystal light valve 12. However, the light modulation device may be reflection type light modulation device such as reflection type liquid crystal light valve. Alternatively, the light modulation device may be micromirror array device capable of modulating light emitted from the light source by controlling the emission direction of the received light for each micromirror as pixel or other devices.

What is claimed is:

1. A projector comprising:
   a projection lens which includes a zoom mechanism capable of controlling a projection view angle;
   a zoom drive unit which drives the zoom mechanism;
   a zoom amount storing unit which stores a zoom amount provided by the zoom drive unit;
   an operation signal receiving unit which receives a predetermined operation signal; and
   a zoom control unit which controls the zoom drive unit in such a manner as to set an initial zoom condition of the projection lens determined based on the zoom amount stored in the zoom amount storing unit when the operation signal receiving unit receives the predetermined operation signal.

2. The projector according to claim 1, wherein the initial zoom condition is a condition corresponding to center zoom amount between minimum zoom amount and a maximum zoom amount stored in the zoom amount storing unit.

3. The projector according to claim 1, wherein the initial zoom condition is a condition corresponding to a zoom amount in which a first zoom operation time for operating the zoom drive unit in such a manner as to set minimum zoom amount stored in the zoom amount storing unit coincides with a second zoom operation time for operating the zoom drive unit in such a manner as to set maximum zoom amount stored in the zoom amount storing unit.

4. The projector according to claim 1, wherein the initial zoom condition is a condition corresponding to the zoom amount stored in the zoom amount storing unit as the zoom amount of the projector used last time.

5. The projector according to claim 1, wherein the predetermined operation signal received by the operation signal receiving unit is a power ON operation signal or a power OFF operation signal.

6. A control method of a projector which includes a projection lens which includes a zoom mechanism capable of controlling a projection view angle, a zoom drive unit which drives the zoom mechanism, and a zoom amount storing unit which stores a zoom amount provided by the zoom drive unit, comprising:
 receiving a predetermined operation signal; and
 controlling the zoom drive unit in such a manner as to set an initial zoom condition of the projection lens determined based on the zoom amount stored in the zoom amount storing unit when the predetermined operation signal is received.

* * * * *